United States Patent
Green et al.

(10) Patent No.: US 8,321,949 B1
(45) Date of Patent: Nov. 27, 2012

(54) MANAGING SOFTWARE RUN IN A COMPUTING SYSTEM

(75) Inventors: Mitch Green, Boulder, CO (US); Luis Polanco, San Jose, CA (US); James Lewin McGregor, Palo Alto, CA (US); Oliver Goldman, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 789 days.

(21) Appl. No.: 12/202,116

(22) Filed: Aug. 29, 2008

(51) Int. Cl.
  *G06F 7/04* (2006.01)
  *G06F 12/14* (2006.01)
  *G06F 15/173* (2006.01)
  *G06F 7/00* (2006.01)
  *H04L 29/06* (2006.01)
  *H04L 9/32* (2006.01)

(52) U.S. Cl. .............. 726/26; 726/24; 726/25; 713/165; 713/179; 713/181; 713/188; 709/224; 707/687; 707/688; 707/696; 707/698

(58) Field of Classification Search .............. 726/24–26; 713/165, 179, 181, 188; 709/224; 707/687, 707/688, 696, 698
See application file for complete search history.

(56) References Cited

U.S. PATENT DOCUMENTS

| 2007/0233854 A1* | 10/2007 | Bukovec et al. | 709/224 |
| 2010/0005291 A1* | 1/2010 | Hulten et al. | 713/156 |
| 2010/0030840 A1* | 2/2010 | O'Shea et al. | 709/201 |

OTHER PUBLICATIONS

"Antispyware Software—Protect Your Computer with Windows Defender" [online] (published Jan. 1, 2007). © Microsoft Corporation 2008 [retrieved on Jul. 22, 2008]. Retrieved from the Internet: http://www.microsoft.com/protect/computer/basics/antispyware. mspx (3 pages).

"Apple's Ability to Deactivate Malicious App Store Apps" [online] (published Aug. 6, 2008). © 2000-2008 MacRumors.com, LLC [retrieved on Aug. 7, 2008]. Retrieved from the Internet: http://www.macrumors.com/2008/08/06/apples-ability-to-deactivate-malicious-app-store-apps/ (4 pages).

"Certificates and Certificate Authorities, Chapter 6-10.6—Fundamental Security Concepts", http://ccfit.nsu.ru/~ilya/grid/manuals/globus/tutorial/ch10s04.html, printed from Web on Dec. 2, 2007 (3 pages).

Housley et al., "Internet X.509 Public Key Infrastructure Certificate and Certificate Revocation List (CRL) Profile," RFC 3280, 127 pages (Apr. 2002).

(Continued)

*Primary Examiner* — Aravind Moorthy
(74) *Attorney, Agent, or Firm* — Fish & Richardson P.C.

(57) ABSTRACT

In general, one aspect of the subject matter described in this specification can be embodied in a system that includes a network-based information server system; and a computer operable to interact with a user interface device and operable to perform operations including: receiving from the network-based information server system status information corresponding to software applications, the status information including black-list information and phoenix-list information; updating a local cache, retained by the computer, with the status information received from the network-based information server system; generating an identifier for a software application, using a digital certificate and a hash value, when the software application is launched on the computer; checking the identifier for the software application against the status information; and notifying a user of the computer when a match is found during the checking.

36 Claims, 8 Drawing Sheets

OTHER PUBLICATIONS

"How to stop an ActiveX control from running in Internet Explorer" [online]. © Microsoft Corporation 2008 [retrieved on Dec. 2, 2007]. Retrieved from the Internet: http://support.microsoft.com/kb/240797 (5 pages).

"Phishing Filter: Help protect yourself from online scams" [online] (published Oct. 28, 2006; updated Apr. 29, 2008). © Microsoft Corporation 2008 [retrieved on Jul. 22, 2008]. Retrieved from the Internet: http://www.microsoft.com/protect/products/yourself/phishingfilter.mspx (4 pages).

"Researcher discovers targeted iPhone app "kill switch"" [online] (published Aug. 6, 2008). AppleInsider © 1997-2008 [retrieved on Aug. 7, 2008]. Retrieved from the Internet: http://www.appleinsider.com/articles/08/08/06/researcher_discovers_long_publicized_iphone_app_kill_switch.html (7 pages).

"Security Vulnerability Research & Defense: The Kill-Bit FAQ: Part 2 of 3" [online]. © 2008 Microsoft Corporation [retrieved on Jul. 22, 2008]. Retrieved from the Internet: http://blogs.technet.com/swi/archive/2008/02/07/The-Kill_2D00_Bit-FAQ_3A00_-Post-2-of-3.aspx (4 pages).

"Antivirus & Content Security Software | Securing Your Web World—Trend Micro USA" [online]. Trend Micro™ [retrieved on Jul. 22, 2008]. Retrieved from the Internet: http://us.trendmicro.com/us/home/ (5 pages)

"Technology Overview" [online]. © 1995-2008 Symantec Corporation [retrieved on Jul. 22, 2008]. Retrieved from the Internet: http://www.symantec.com/about/profile/technology.jsp (4 pages).

"The best antivirus and antispyware now with firewall" [online]. Webroot.com [retrieved on Jul. 22, 2008]. Retrieved from the Internet: http://www.webroot.com/En_US/consumer-products-antivirus.html (3 pages).

"McAfee—Antivirus Software and Intrusion Prevention Solutions" [online] McAfee® [retrieved on Jul. 22, 2008]. Retrieved from the Internet: http://www.mcafee.com/us/ (2 pages).

"Tutorial Introduction Digital Certificates PKI Guide Encryption Signing Signature", Verisign, www.verisign.com.au/repository/tutorial/digital/intro1.shtml, printed from Web on Dec. 2, 2007 (5 pages).

"Using Digital Certificates" [online]. © Microsoft Corporation 2008 [retrieved on Jul. 22, 2008]. Retrieved from the Internet: http://www.microsoft.com/technet/prodtechnol/windows2000serv/reskit/ierk/Ch06_c.mspx (7 pages).

U.S. Appl. No. 11/845,703, filed Aug. 27, 2007, 33 pages, to be published by the USPTO.

U.S. Appl. No. 11/951,951, filed Dec. 6, 2007, 38 pages, to be published by the USPTO.

U.S. Appl. No. 12/026,410, filed Feb. 5, 2008, 34 pages, to be published by the USPTO.

U.S. Appl. No. 12/062,487, filed Apr. 3, 2008, 44 pages, to be published by the USPTO.

U.S. Appl. No. 12/001,497, filed Dec. 11, 2007, 20 pages, to be published by the USPTO.

\* cited by examiner

MANAGING SOFTWARE RUN IN A COMPUTING SYSTEM

BACKGROUND

The present disclosure relates to managing software run in a computing system, such as software applications that run in a cross-platform runtime environment of a computing platform.

Many approaches to managing software that is run in computing systems have been developed, and in particular, various approaches have been taken to help prevent malicious software from being installed or run on a computer. For example, WINDOWS® based computer platforms often enable the use of certificates to sign software applications to be installed on the computer. Such certificates can be checked at install time, and various notifications regarding the software application can be provided to the user, based on the certificate, at the time of installation, to help the user in determining whether or not to proceed with the installation. In addition, such certificates can be revoked.

Furthermore, when a software program (such as a plug-in to a Web browser) is downloaded from the Internet, the software program is typically signed by a certificate. In such a case, the Web browser provides information from the digital certificate (e.g., the identity of the entity that signed the application using the certificate) along with a notice regarding the risks of trusting the information and the program, in order to help the user in safe guarding their computer from potentially malicious programs. For example, if the authenticity of the certificate cannot be established (such as may be the case if the digital certificate is a self-signed certificate), the Web browser will notify the user of the increased risk of installing such software, as opposed to software that has been signed by a certificate that is co-signed by a recognized certificate authority.

Moreover, various commercially available software products provide anti-spyware and anti-virus features designed to maintain computer security. These software products typically scan files (e.g., executable files) to identify viruses, Trojan horses, worms, etc. The scanning is typically performed periodically for software and data stored on a computer, and for network communications at the time of sending or receiving. Such programs can also be set up to automatically scan software at the point of installation. Moreover, such programs have also included functionality to verify trusted Web sites and block fake Web sites.

Checking for fake Web sites has also been implemented in at least one Web browser. Internet Explorer (provided by Microsoft Corporation of Redmond, Wash.) includes an option to turn on a phishing filter service. When a user opts-in to this service, every time the user clicks on a link to a Web page, the browser, in parallel with requesting the resources at the link, sends the URL (Uniform Resource Locator) to a phishing filter Web site where a list of malicious URLs is maintained. If the selected URL appears on this list, a message is sent back to the browser, and an appropriate action is taken by the browser, such as warning the user and asking for confirmation to proceed to the URL, or outright blocking of that URL.

SUMMARY

This specification describes technologies relating to managing software run in a computing system, such as software applications that run in a cross-platform runtime environment of a computing platform.

In general, one aspect of the subject matter described in this specification can be embodied in a system that includes a network-based information server system; and a computer operable to interact with a user interface device and operable to perform operations including: receiving from the network-based information server system status information corresponding to software applications, the status information including black-list information and phoenix-list information; updating a local cache, retained by the computer, with the status information received from the network-based information server system; generating an identifier for a software application, using a digital certificate and a hash value, when the software application is launched on the computer; checking the identifier for the software application against the status information; and notifying a user of the computer when a match is found during the checking. Other embodiments of this aspect include corresponding apparatus, methods and computer program products.

The notifying can include presenting a warning user interface in which an option to continue launching the software application is contained within the warning user interface when the identifier indicates that the software application falls within either the black-list information or the phoenix-list information, wherein the warning user interface identifies the software application as malicious when the software application falls within the black-list information, and the warning user interface identifies the software application as having a security flaw and indicates a source for an updated version when the software application falls within the phoenix-list information. The operations can further include, when the identifier matches the black-list information: preventing the software application from running on the computer; and uninstalling the software application from the computer.

Receiving the status information can include receiving the status information further including white-list information, and the operations can further include generating the identifier for the software application, using the digital certificate and the hash value, when the software application is installed on the computer and when the software application is updated on the computer. The notifying can include presenting an indication of approval within an installation user interface when the identifier indicates that the software application falls within the white-list information, wherein the indication of approval corresponds to a white-list record for the software application.

Receiving the status information, updating the local cache, generating the identifier when the software application is installed, launched and updated, checking the identifier and notifying the user can each be performed by a cross-platform runtime environment in which the software application runs. The identifier can identify a publisher of the software application, and the receiving and the updating can be performed periodically and based at least in part on a software installation occurring through the cross-platform runtime environment. Moreover, the network-based information server system can be operable to prioritize the status information to be sent to the computer.

Generating the identifier for the software application can include generating an identifier corresponding to a software component of the software application when the software application is updated on the computer by addition of the software component. Checking the identifier can include checking the identifier for the software application against the status information in the local cache retained by the computer and against new status information obtained from the network-based information server system. Moreover, updating the local cache can include updating the local cache in a file system location requiring elevated privilege, and the updating can be performed at times when the system elevates privilege for other reasons.

Particular embodiments of the subject matter described in this specification can be implemented to realize one or more of the following advantages. Every application to be run on a computer platform (e.g., in an application execution environment on a computing system) can be signed by a certificate and have a unique identifier that is derived from the certificate and a hash value obtained by running a hashing algorithm over data from the application, which data can include both the code of the application and the digital certificate for the application. The unique identifier for the application (or information from which the identifier can be derived) can be sent to a network-based service that returns information about the application's nature (e.g., whether or not the application is malicious). The unique identifier for the application can be checked against multiple lists in a local cache (retained by the computer) in order to assist an end user in managing what software is installed, run and updated on the computer. Use of a local cache that is updated using a network-based service allows protection to extend to offline situations while also facilitating up to the minute information regarding which software can be used safely.

Moreover, updating of the local cache can be governed by a security setting specified by a user of the computing system (e.g., update the cache only when installing the program that connects to the service, update the cache whenever software is installed or updated on the computing system, or update the cache whenever appropriate to enhance security). Alternatively, such security settings can be handled entirely automatically, without user input. Furthermore, a runtime environment can manage the local cache and can include logic to handle how often checks for updates are performed.

The unique identifier can be specific to a publisher of the application, to a developer/author of the application, to the application itself, or to a component of the application, and an application, or software component thereof, can have multiple associated identifiers. Thus, individual applications or whole groups of applications can be readily set aside for special treatment (e.g., if a software developer has been identified as malicious, all the software created by that developer can be readily marked as malicious). Note that in some implementations, the publisher, developer and author can all be considered one-in-the-same, i.e., the party who has control of the signing credentials; thus, the system can allow revocation of a publisher/developer/author, thus revoking any application signed by such.

The multiple lists can include a black list that identifies malicious software, a white list that identifies trusted software, and a phoenix list that identifies software having a security flaw. Thus, a network-based service can be provided whereby end users can be given timely information for use in managing the software that will be run on their computer. Moreover, the phoenix list can be used as an upgrade triggering mechanism that is separate from a regular software update triggering mechanism employed directly by the software application itself. Thus, the network-based service can also allow software publishers to have all users of their software updated to a new version in the event that they discover a critical error in their software, even when they failed to previously program an update option into the software application itself. Furthermore, developers can be allowed to gracefully have their applications turned off and upgraded to ensure end user security without incurring the penalty of their applications being deemed malicious or being considered "untrusted" by end users because of the security flaw; this feature can thus help in saving a publisher/developer's reputation (as well as the platform provider's reputation) with end users. Users can be saved from using applications with security flaws when the developer of those applications has failed to provide for other more automatic upgrades.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A software application (which for brevity will simply be referred to as an application) is a computer program designed to add functionality to a general purpose computer. An application does not necessarily correspond to a file, may be stored in a portion of a file that holds other information, in a single file dedicated to the application in question, or in multiple coordinated files (which can be both local and remote). A software component of an application is a piece of software used with other software to build an application. A software component can include other components, does not necessarily correspond to a file, may be stored in a portion of a file that holds other information, in a single file dedicated to the software component in question, or in multiple coordinated files (which can be both local and remote).

Figure 1:
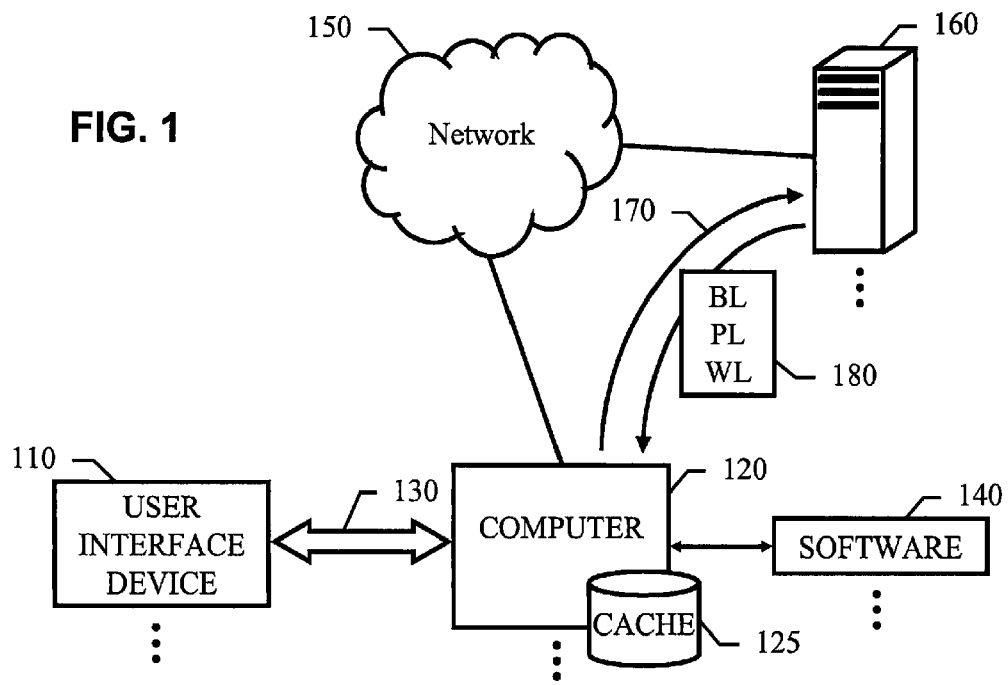
FIG. 1 shows an example system in which the software to be run on a computer is managed based on status information including multiple list types.

FIG. 1 shows an example system in which the software to be run on a computer is managed based on status information including multiple list types. One or more user interface devices (110) are communicatively coupled with one or more computers (120) through a channel (130). The channel (130) can include wired or wireless channels, one or more internal computing system busses, one or more computer networks, or combinations thereof. The user interface device(s) (110) can include input/output devices (e.g., a display, keyboard and mouse), and the computer(s) (120) can be separate from the user interface device(s) (110) (e.g., server computers accessible over a network) or integrated with the user interface device(s) (110) (e.g., a laptop computer, a mobile device, a set top box, or other devices, having a computer and a user interface device included therein).

A computer (120) has associated software (140) that can be installed, run and updated. The software (140) can include both applications and software components thereof, which are identified in order to manage whether the software (140) will be allowed to run on the computer (120). The computer (120) can create identifiers for the software (140) using associated digital certificates and hash values. The individual software applications and components can be digitally signed with certificates using known techniques. A certificate used in digitally signing software can be associated with a publisher/developer of the software, can be specific to the software in question, or both.

Moreover, a digital certificate for the software in question can include multiple certificates, such as a chain of certificates created when the software was originally signed (e.g., by the software publisher). The digital certificate can be a self-signed certificate or a counter-signed certificate (e.g., signed by a Certificate Authority, such as VeriSign, Inc. of Mountain View, Calif.). Note that in many scenarios, an embedded certificate chain will be the typical situation. Creating the identifier for the software from a digital certificate can involve using a chain of certificates, and the identifier can be used in a computing system to manage installation, running and updating of the software, as described further below.

The computer (120) can be connected to one or more information server systems (160) through a network (150). The network (150) can include a public network (e.g., the Internet or the public switched telephone network), a private network (e.g., an enterprise network or a virtual private network), or both. A network-based information server system (160) can be a single server computer or multiple server computers (e.g., a server cluster, a server farm, or distant server computers linked through a network). The computer (120) sends a request (170) to the network-based information server system (160), and in response to the request (170) the network-based information server system (160) sends status information (180) back to the computer (120). The request (170) can be explicit, such as a specific request for at least a portion of the status information (180), or the request (170) can be implicit, such as a request for a connection with the server system (160) for other services. Moreover, the request (170) can be sent periodically (e.g., based upon rules that can be pre-configured within the software application or dynamically configured and adjusted within the software application by a server system), sent upon designated events (e.g., whenever the computer (120) reconnects to the network (150) after being offline for awhile, or whenever the computer (120) installs or updates software (140) using a connection over the network (150)), or a combination of these. Further, the times when the request (170) is sent can be limited based on network bandwidth, computing system processing resources, and other factors for the overall system.

In any case, the status information (180) can include information for three different types of lists corresponding to software (140) that can be installed, run and updated on the computer (120), namely, a black list, a phoenix list, and a white list. The black list identifies software that has been determined to be malicious. The black list can also include the reason the application is deemed malicious, the partner-vendor responsible for determining the malicious state, and a URL/link to a web page with additional information. The phoenix list identifies software that has been determined to have a security flaw. The phoenix list can also include all of the information in the blacklist plus a URL where a new version of the software can be downloaded. The white list identifies software that has been determined to be approved in some fashion, thus suggesting that it can be more readily trusted by the end user. The white list can also include a URL to the location where the publisher's logo can be downloaded for display within user-facing dialogs. Moreover, the determinations of software placement into the various lists can be performed by the operators of the network-based information server system (160), but such determinations can also be based on input provided by third parties. For example, the determination that specific software should be placed on the white list can be based on the nature of the publisher/developer of the software, including potentially information about the publisher/developer collected through a white listing service (e.g., a Web-based service that allows user to rate software publishers/developers).

Once received, the status information (180) is used to update a local cache (125) retained by the computer (120). The local cache (125) can include all three lists, can be implemented using hardware, firmware and software elements, and can employ encryption and anti-tampering techniques to maintain the security of the data therein. When the identifiers for the software (140) are created, the local cache (125) can be checked for these identifiers to determine whether the software (140) falls into any of the various lists. Furthermore, the status information (180) received from the server system (160) can be checked directly, before the cache (125) is updated, when the computer (120) is connected to the network (150).

In some implementations, the local cache (125) can be stored in the OS file system. However, in order to help prevent the same applications that the lists refer to (if already installed) from having access to that same file system, the local cache (125) can be placed in a location that can only be written from a process with elevated privilege and is otherwise read-only. Elevating the privilege level can be done every time the list is updated. However, since this typically requires prompting the user for approval, updates to the local cache (125) can be saved for times when the system elevates the privilege level for other reasons, such as when a runtime environment is installed or updated. In this fashion, the local cache (125) can be protected from malicious applications. Further, a copy of the various lists can be incorporated into the runtime installer itself to pre-populate the cache; thus, giving the runtime some information to work with even if it cannot immediately contact the server(s) for updated information. Moreover, this process of waiting for opportune times to update the local cache (125) can also be employed for other cache files used in the system, with or without the specific three list caching.

Note that in some implementations, the local cache (125) can be made relatively compact such that not all know applications that fall into the three lists will be cached locally. In such cases, the server system (160) can rank the priority of the various known applications that fall into the three lists and then update the local cache (125) with the highest priority information at any given time. The priority ranking can be based on various factors, including how often users try to install and run applications from a given list, how dangerous a particular malicious application, or a particular security flaw is, etc. Thus, for example, when a client computer system is offline and trying to install or run a malicious application, it will be more likely to be in the cache of currently "hot" malicious applications.

Moreover, when the computer (120) does contact the server system (160), it can check the status for all installed applications whether they are currently being used or not. Any resulting installed malicious applications can be flagged immediately or added to the local cache (125). Thus, the local cache (125) can be viewed as serving two purposes: (1) to enable protection in the offline case; and (2) to reduce latency and provide a first level response before the server responds when launching an application. In some implementations, in the offline case, the user can be provided a "provisional" go ahead, such that the user is advised that it would be safer to go online before installing an application.

Figure 2:
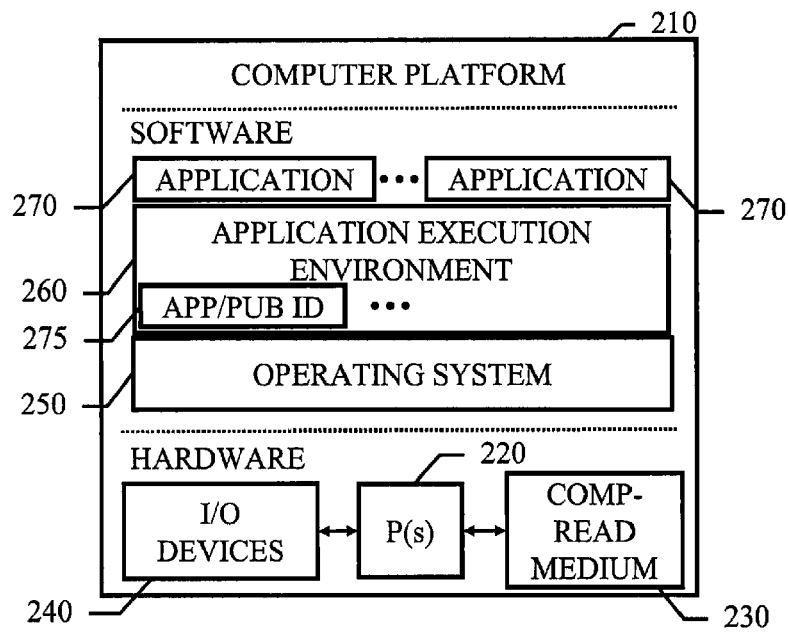
FIG. 2 shows an example computing system, including an application execution environment, in which software applications are identified.

A computer (120) can include any one of many different types of computer platforms, which can run different operating systems. In addition, a computer (120) can include a computing system that has additional software installed, on which the software (140) depends. For instance, FIG. 2 shows an example computing system, including an application execution environment, in which software applications are identified. A computer platform (210) includes both hardware and software. The hardware includes input/output devices (240), one or more processors (220) and at least one computer readable medium (230) (e.g., memory device(s), a storage device(s), or combinations of one or more of them). The software can include an operating system (OS) (250) on which the software elements of the computer platform (210) operate. In addition, an application execution environment (260) can use the operating system (250) to interact with other elements of the computer platform (210). The application execution environment (260) can provide various utility services for use by applications that run in the application execution environment (260). These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provided using a runtime library. Moreover, the application execution environment (260) can include a cross-platform application program interface (API) that provides services to applications (270) that run in the application execution environment (260) and serves to abstract away details of the various hardware and OS platforms on which the application execution environment program (260) has been designed to operate.

The application execution environment (260) can be a cross-OS runtime environment, such as the Adobe® AIR™ runtime, provided by Adobe Systems Inc. of San Jose, Calif. In some implementations, the application execution environment (260) can load an application (270) from an encoded representation of the application (270). For example, the encoded representation can have a predefined syntactic structure such as a programming language (e.g., source code) or can include well defined virtual instructions (e.g., platform-independent bytecode, such as Macromedia Flash® bytecode). To load such applications, the application execution environment (260) can decode the encoded representation of the application (270) into instructions and can execute the instructions of the application.

In addition, the application execution environment (260) can create software identifiers (275) for the applications (270) using the digital signatures associated therewith. These software identifiers (275) can include publisher/developer-specific identifiers and application-specific identifiers, and can be relatively long lived (e.g., 3-5 years, or more), allowing further feature development within the application execution environment (260) based on the software identifiers (275). For example, the software identifiers (275) can be used to facilitate inter-application communications, to provide application-specific secure storage in the computer platform (210), or to support a generic installer mechanism for applications to be installed on the application execution environment (260).

The software identifiers (275) can be used for other purposes as well, such as to identify an application that plays media content subject to digital rights management (DRM) requirements. Such an application can be confirmed as authentic and uniquely identified before media content or decryption key(s) are delivered to the application. Note that the software identifiers (275) should generally be consistent from one computing system to another, and the author or publisher of the applications (270) should have control over their respective software identifiers (275). In any case, the software identifiers (275) can be used to manage which applications (270) are allowed to be installed, run and updated in the computer platform (210). Moreover, in some implementations, a runtime configuration setting can be made available that allows users to turn off the checks described herein.

Figure 3:
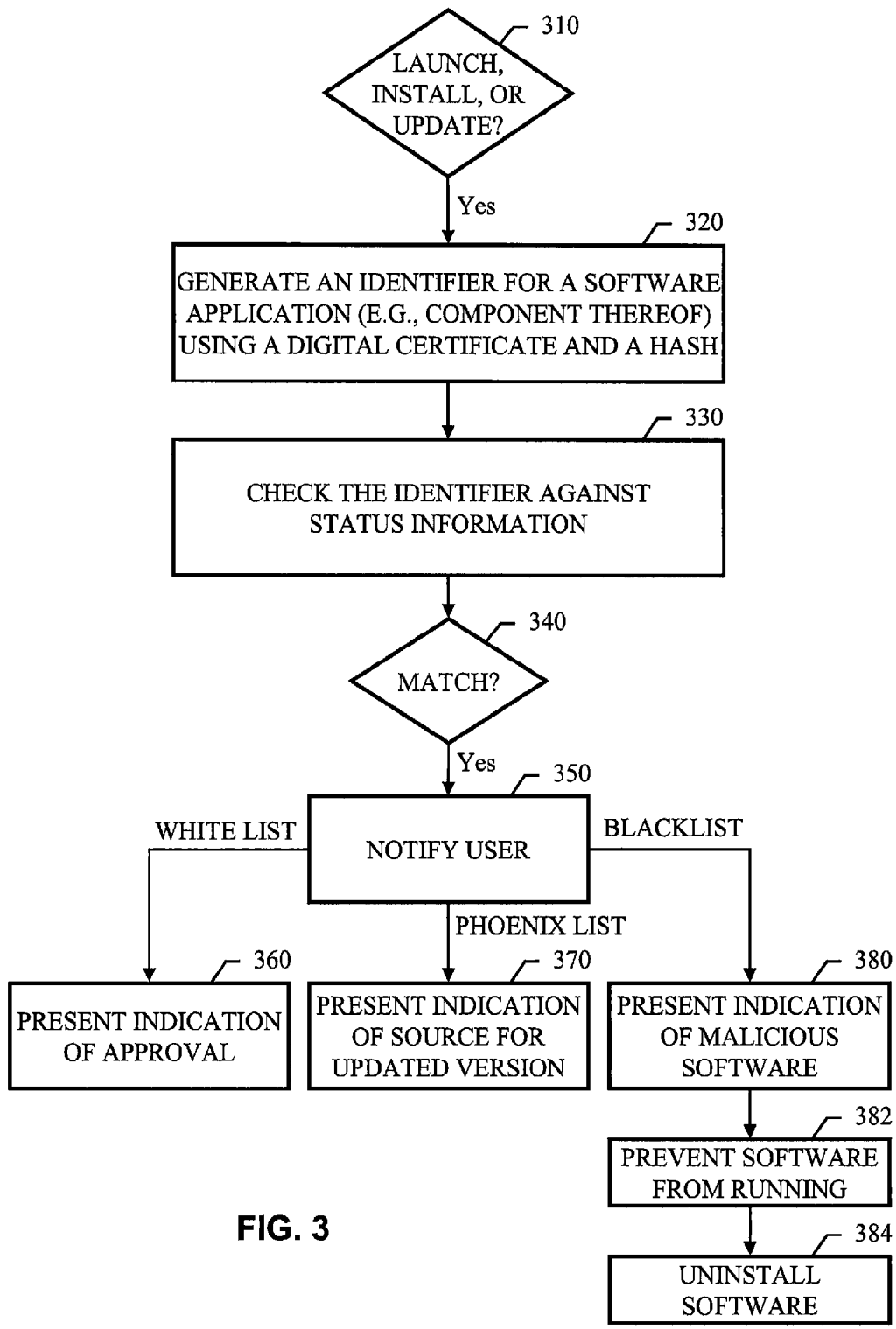
FIG. 3 shows an example process of managing software run in a computing system.

FIG. 3 shows an example process of managing software run in a computing system. The process can begin when software is launched, installed or updated (310). Launching software means initiating the running of the software, such as by double clicking on an icon representing a software application in a graphic user interface of a computing system. Installing software means making changes to a computing system to allow the software to be run on the computing system in a specified manner, such as by running an installer program in which the software is embedded. Updating software means changing a component of the software, such as by adding or modifying a component of an already installed software application, or by adding or modifying a component to a software application being created (e.g., when an application execution environment used to run the software applications also provides functionality for creating new software applications from existing software components).

An identifier for the software application can be generated (320) using a digital certificate and a hash value. As noted above, the identifier for the software application can correspond to a software component included within the software application. The hash value can be obtained by running a hashing algorithm over one or more portions of the software application, including potentially just a portion of a digital certificate embedded in the software application or bundled therewith. Other information can be used to create the identifier as well, such as a name of the software application or software component.

Moreover, one or more portions of the digital certificate can be used in creating the software identifier. For example, certificate owner names (e.g., certificate subjects, distinguished names, alternative names or Domain Name Service (DNS) entries) can be used in generating software identifiers. This can make the application identifies more robust, allowing them to survive changes to the digital certificates used with the software. Note that, typically, when a Certificate Authority reissues a certificate (e.g., in case of certificate expiry), the new certificate identifies the certificate owners (and thus the application author) the same way as before. For additional details regarding various techniques for creating a software identifier, see U.S. patent application Ser. No. 12/001,497, entitled "Application Identification", filed Dec. 11, 2007.

Once generated, the identifier can be checked (330) against status information in a local cache retained by the computing system. The status information can include entries, where each entry includes a software identifier (e.g., a single value or a multi-value identifier), an indication of which list the identifier falls within (e.g., a two bit flag), and an optional information field (e.g., a two hundred and fifty six byte field used to store text information regarding the software corresponding to the identifier). As will be appreciated, the "lists" referred to here need not be stored in a list-based data structure. The lists can be stored as one or more files, relationals, binaries, etc., and can employ various data formats, such as XML (eXtensible Markup Language). Moreover, an embedded database can be used in some implementations.

Figure 4A:
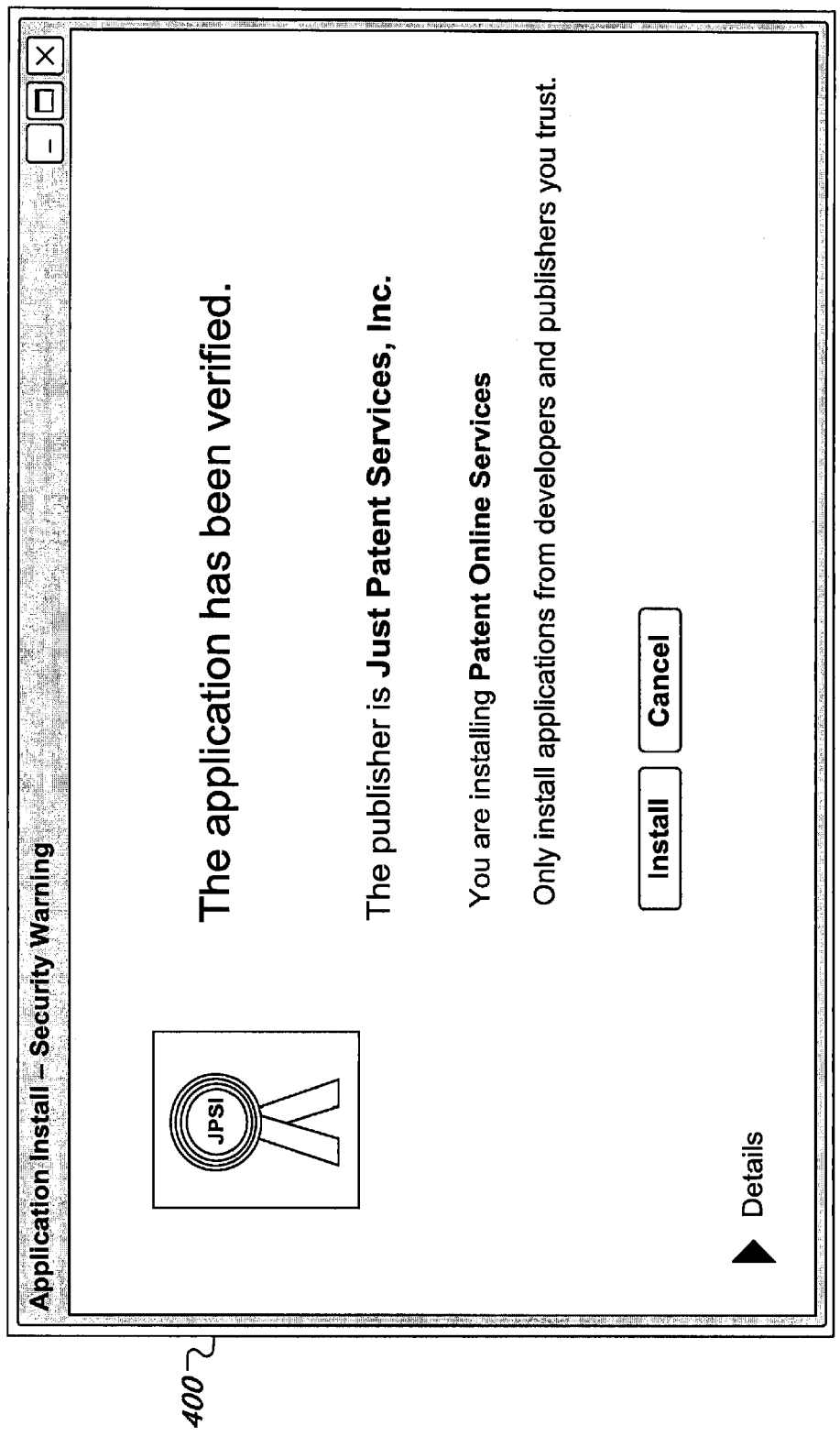
FIGS. 4A-4F show example user interface screens that can be used in a process of managing software run in a computing system.
Figure 4B:
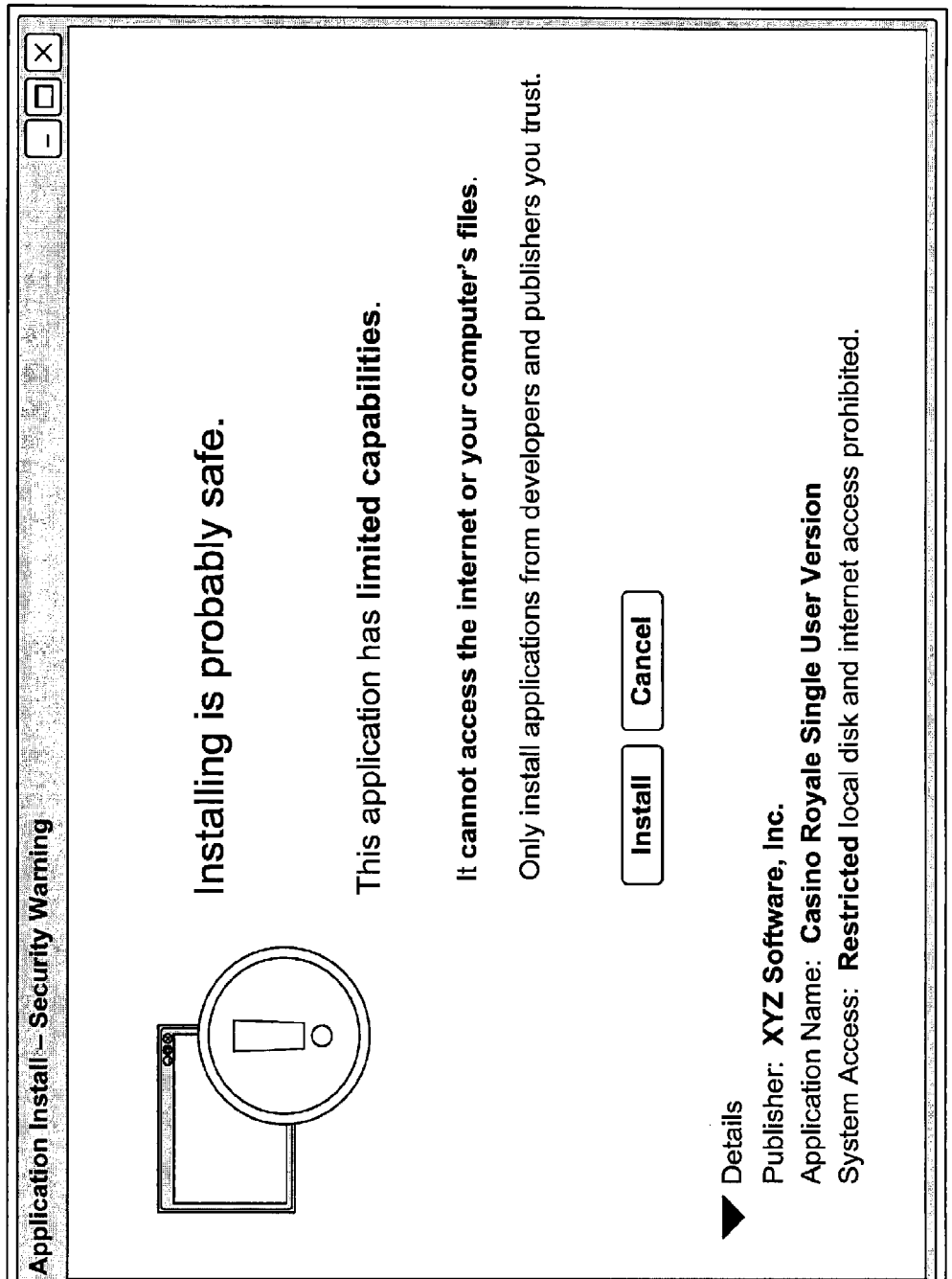

If the generated identifier matches (340) an identifier in the cache, a user of the computing system can be notified (350) in accordance with the match. If the identifier falls within the white list, an indication of approval for the software can be presented (360) to the user to show that the software should more likely be trusted. The indication of approval can include a logo of a publisher of the software, an independent developer's certification mark, text information regarding why the software can be trusted, or a combination of these. For instance, FIG. 4A shows an example installation user interface (400) including an indication of approval presented for software that is being installed, where the indication of approval includes a logo for the publisher, Just Patent Services, Inc. As another example, FIG. 4B shows an example installation user interface (410) including an indication of approval presented for software that is being installed, where the indication of approval includes text information that indicates the software can be trusted because it has limited capabilities.

Some or all of the data for the indication of approval can be retrieved from the optional information field in the local cache, or from a network resource. Thus, the user interface can be constructed using one or more dialogues that include placeholders for information to be provided on the fly, including information like the software name, the software publisher, and the information regarding which (if any) list the software falls under.

Referring again to FIG. 3, if the identifier falls with the black list, an indication of malicious software can be presented (380) to the user to show that the software should not be trusted. This can involve notifying the user that the software is malicious while the software is both prevented (382) from running on the computing system, and while the software is uninstalled (384) from the computing system. Alternatively, the user can be notified that the software has been deemed malicious, but still be allowed to run the software.

Figure 4C:
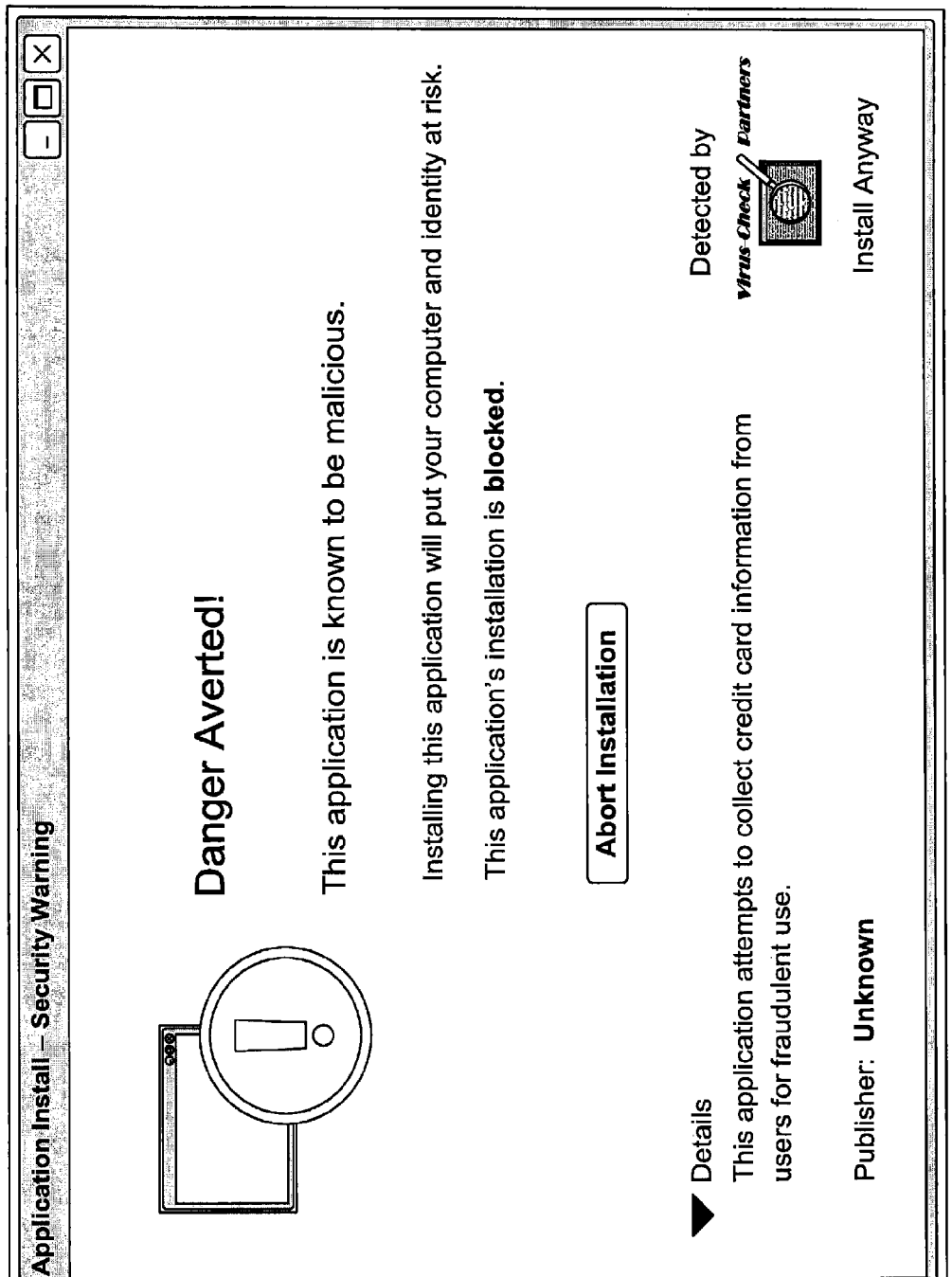
Figure 4D:
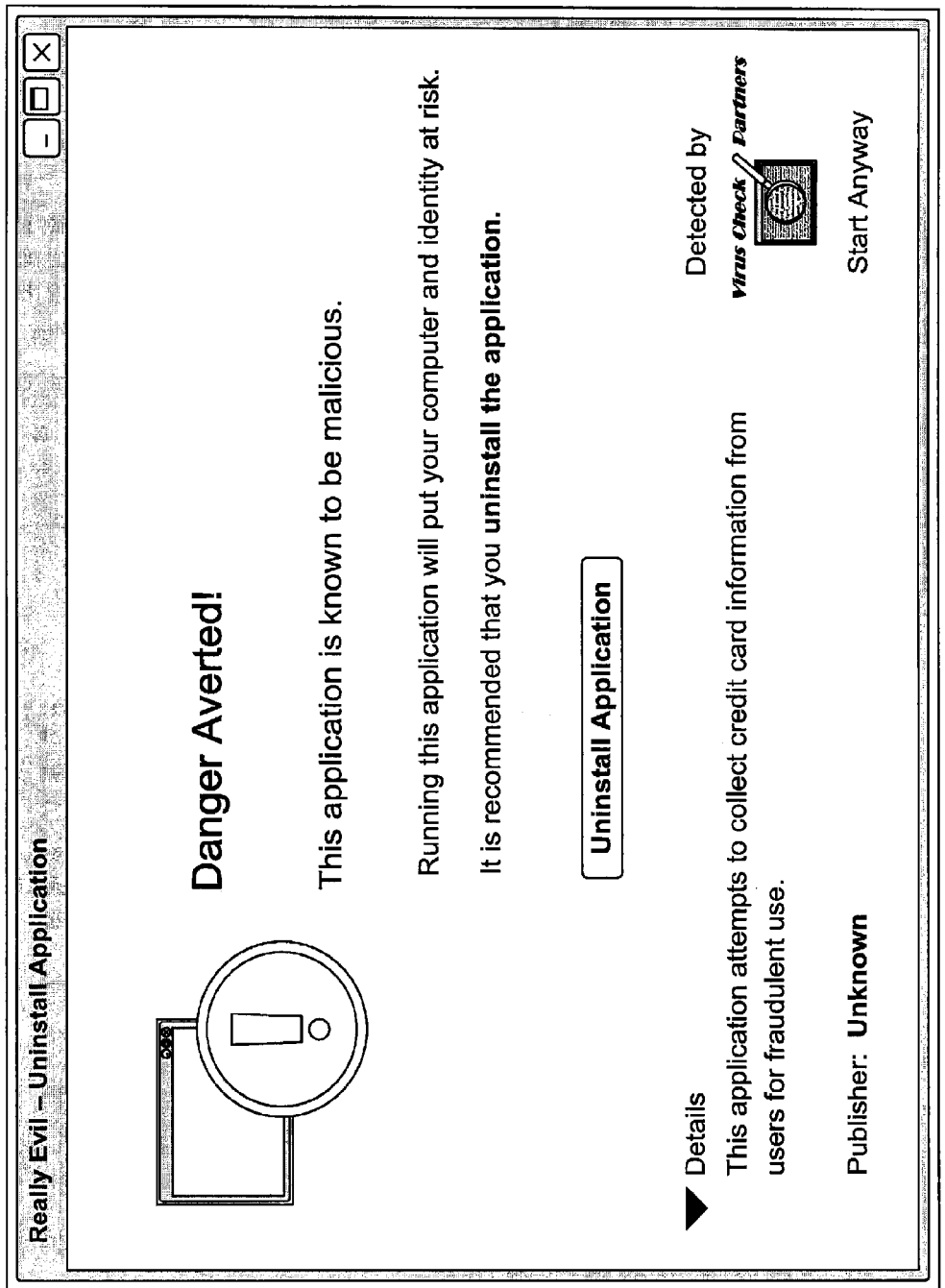

For instance, FIGS. 4C and 4D show example warning user interfaces 420 and 430 in which an option to continue installing or launching the software application is obfuscated within the user interface, e.g., by first presenting the user interfaces 420 and 430 with the details tab closed, and only presenting the "Install Anyway" and "Start Anyway" options when the details tab is opened. The warning user interface identifies the software as malicious and can clearly indicate that the software should not be installed or run, or should be done so "at your own risk." The identification of the software as malicious can include software-specific information (e.g., the nature of the malicious behavior), which can be retrieved from the optional information field in the local cache, or from a network resource. Thus, again, the user interface can be constructed using one or more dialogues that include placeholders for information to be provided on the fly. Furthermore, in this example, the use of obfuscation in presenting the option to continue in the user interface allows the user to proceed with running the software, but provides a measure of security in that the user is more likely to read the warning before selecting the option to continue.

Referring once again to FIG. 3, if the identifier falls with the phoenix list, the software can be identified as having a security flaw and an indication of a source for an updated version can be presented (370) to the user. The indication of the source can be a link to a network location (e.g., a HyperText Transfer Protocol reference to a Universal Resource Locator) where an updated version of the software can be obtained. Moreover, as in the case of malicious software, the user can be notified that the software has a security flaw while the software is both prevented from running on the computing system, and while the software is uninstalled from the computing system. Alternatively, the user can be notified that the software has a security flaw, but still be allowed to run the software.

Figure 4E:
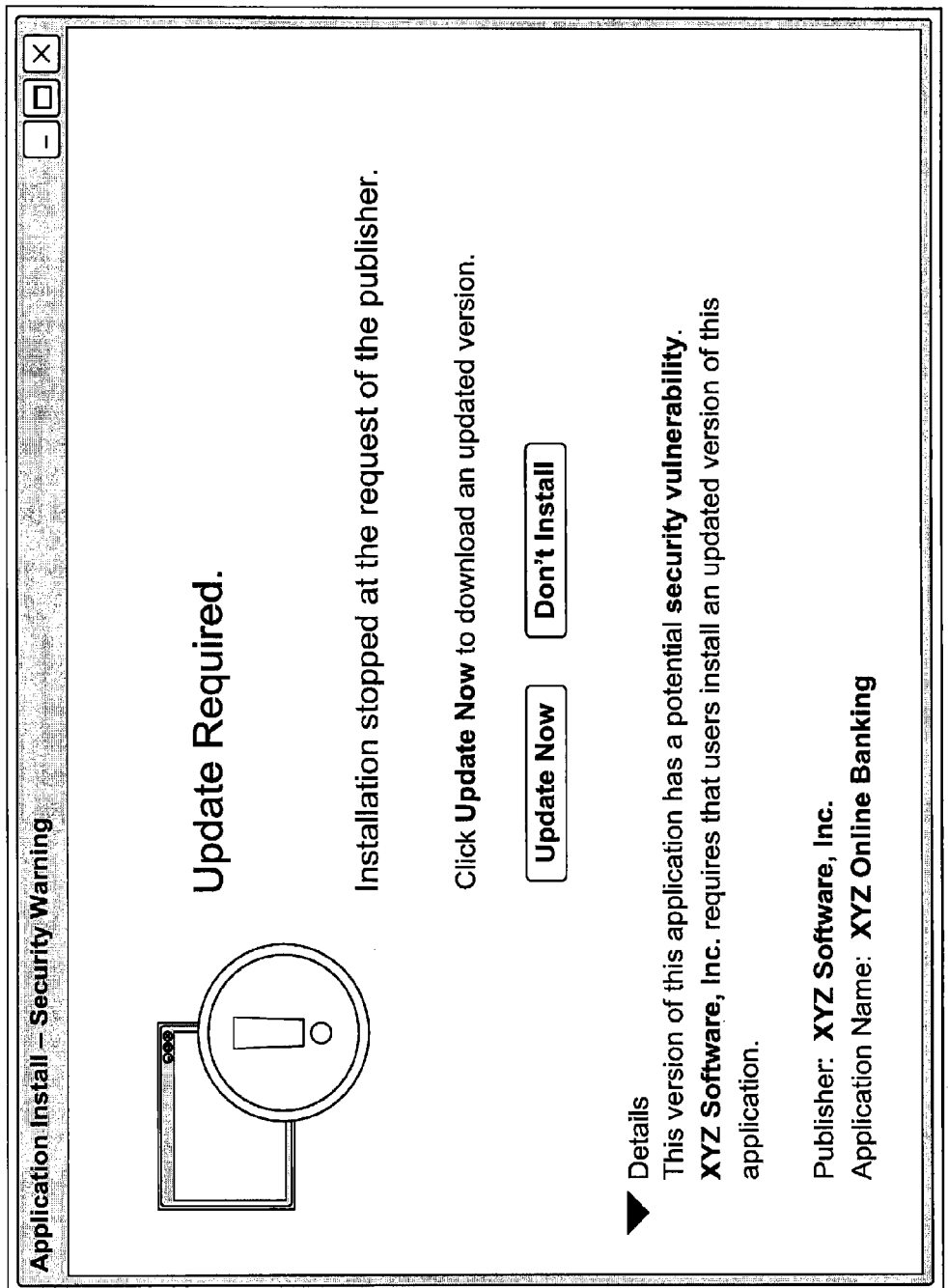
Figure 4F:
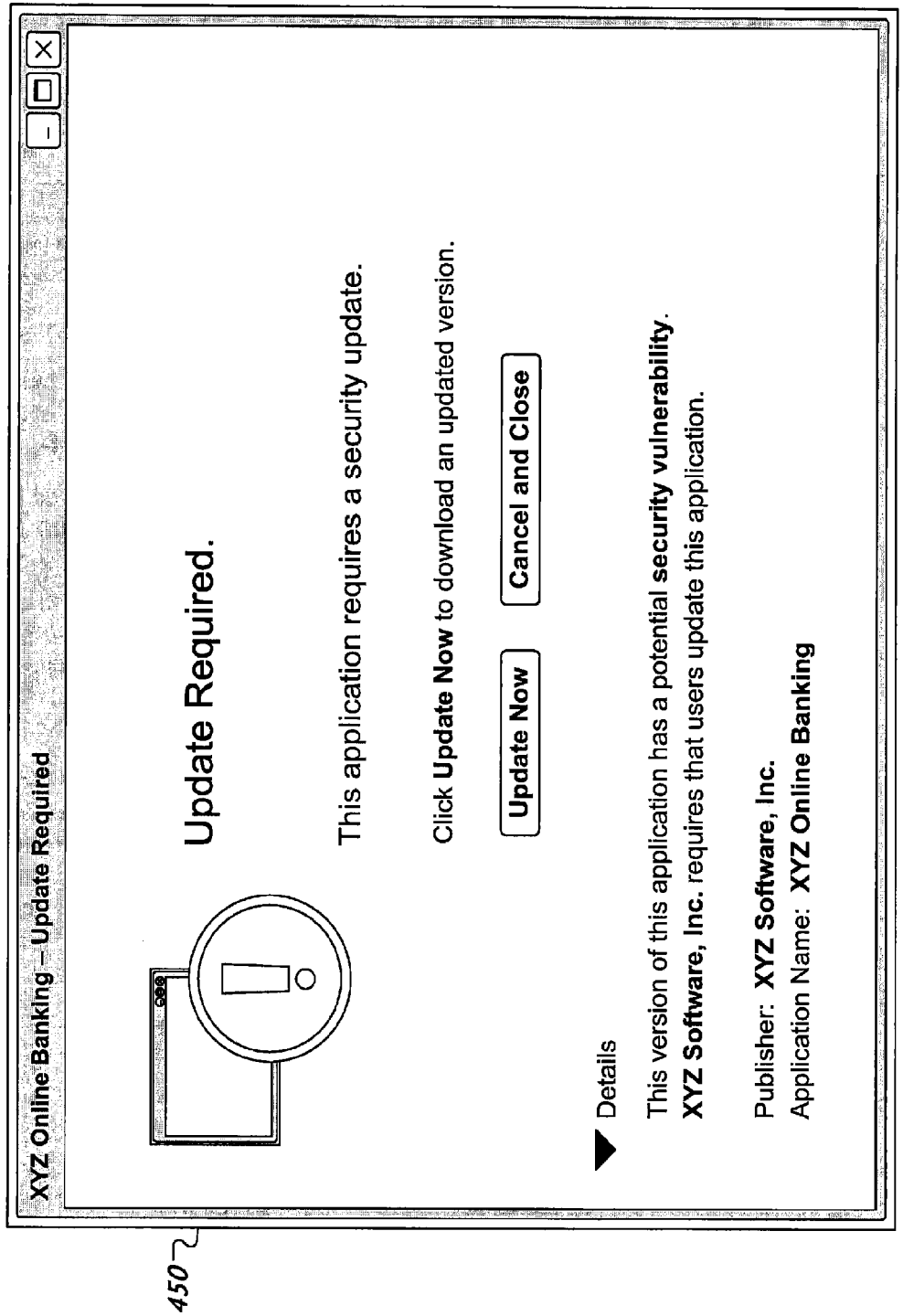

FIGS. 4E and 4F show example warning user interfaces 440 and 450 in which an option to continue installing or launching the software application is not provided. The warning user interface identifies the software as having a security flaw and can clearly indicate that the software should not be installed or run, or should be done so "at your own risk." The identification of the software as having a security flaw can include software-specific information (e.g., the nature of the security flaw), which can be retrieved from the optional information field in the local cache, or from a network resource. Thus, again, the user interface can be constructed using one or more dialogues that include placeholders for information to be provided on the fly. Furthermore, the use of obfuscation in presenting the option to continue in the user interface allows the user to proceed with running the software, but provides a measure of security in that the user is more likely to read the warning before selecting the option to continue.

This approach of identifying software as having a security flaw and enabling an upgrade to a newer versions can be provided in addition to a separate mechanism for software upgrades. For example, an application execution environment can include an API to facilitate software upgrades. Thus, a software application can include one or more function calls to the application execution environment that are used to update the application when a new version is published. The phoenix list can then be used as an upgrade mechanism that is separate from the API used for pushing out normal software updates, or be partially integrated therewith. For example, a runtime environment's API can include interfaces for update that can be called by the software application itself or by the runtime environment, and these interfaces can employ the same underlying code mechanisms or have at least some different underlying code mechanisms (e.g., separate update notification and delivery mechanisms for the software application versus the runtime environment). Thus, this provides a value added service that allows software publishers to have all users of their software updated to a new version in the event that they discover a critical error in their software, even when they failed to previously program an update mechanism into the software application itself.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The invention claimed is:

1. A computer-implemented method comprising:
    receiving, at a computer from a network-based information server system, status information corresponding to software applications, the status information comprising black-list information and phoenix-list information;
    updating a local cache, retained by the computer, with the status information received from the network-based information server system;
    generating an identifier for a software application, using a digital certificate and a hash value, when the software application is launched on the computer;
    checking the identifier for the software application against the status information; and
    notifying a user of the computer when a match is found during the checking.

2. The computer-implemented method of claim 1, wherein the notifying comprises presenting a warning user interface in which an option to continue launching the software application is contained within the warning user interface when the identifier indicates that the software application falls within either the black-list information or the phoenix-list information, wherein the warning user interface identifies the software application as malicious when the software application falls within the black-list information, and the warning user interface identifies the software application as having a security flaw and indicates a source for an updated version when the software application falls within the phoenix-list information.

3. The computer-implemented method of claim 1, further comprising, when the identifier matches the black-list information:

preventing the software application from running on the computer; and uninstalling the software application from the computer.

4. The computer-implemented method of claim 1, wherein receiving the status information comprises receiving the status information further comprising white-list information, the method further comprising generating the identifier for the software application, using the digital certificate and the hash value, when the software application is installed on the computer and when the software application is updated on the computer.

5. The computer-implemented method of claim 4, where the notifying comprises presenting an indication of approval within an installation user interface when the identifier indicates that the software application falls within the white-list information, wherein the indication of approval corresponds to a white-list record for the software application.

6. The computer-implemented method of claim 4, wherein receiving the status information, updating the local cache, generating the identifier when the software application is installed, launched and updated, checking the identifier and notifying the user are each performed by a cross-platform runtime environment in which the software application runs.

7. The computer-implemented method of claim 6, wherein the identifier identifies a publisher of the software application, and wherein the receiving and the updating are performed periodically and based at least in part on a software installation occurring through the cross-platform runtime environment.

8. The computer-implemented method of claim 4, wherein generating the identifier for the software application comprises generating an identifier corresponding to a software component of the software application when the software application is updated on the computer by addition of the software component.

9. The computer-implemented method of claim 4, wherein checking the identifier comprises checking the identifier for the software application against the status information in the local cache retained by the computer and against new status information obtained from the network-based information server system.

10. A computer-readable medium encoding a computer program product, operable to cause data processing apparatus to perform operations comprising:

receiving, at a computer from a network-based information server system, status information corresponding to software applications, the status information comprising black-list information and phoenix-list information;

updating a local cache, retained by the computer, with the status information received from the network-based information server system;

generating an identifier for a software application, using a digital certificate and a hash value, when the software application is launched on the computer;

checking the identifier for the software application against the status information; and notifying a user of the computer when a match is found during the checking.

11. The computer-readable medium of claim 10, wherein the notifying comprises presenting a warning user interface in which an option to continue launching the software application is contained within the warning user interface when the identifier indicates that the software application falls within either the black-list information or the phoenix-list information, wherein the warning user interface identifies the software application as malicious when the software application falls within the black-list information, and the warning user interface identifies the software application as having a security flaw and indicates a source for an updated version when the software application falls within the phoenix-list information.

12. The computer-readable medium of claim 10, the operations further comprising, when the identifier matches the black-list information:

preventing the software application from running on the computer; and uninstalling the software application from the computer.

13. The computer-readable medium of claim 10, wherein receiving the status information comprises receiving the status information further comprising white-list information, the operations further comprising generating the identifier for the software application, using the digital certificate and the hash value, when the software application is installed on the computer and when the software application is updated on the computer.

14. The computer-readable medium of claim 13, where the notifying comprises presenting an indication of approval within an installation user interface when the identifier indicates that the software application falls within the white-list information, wherein the indication of approval corresponds to a white-list record for the software application.

15. The computer-readable medium of claim 13, wherein receiving the status information, updating the local cache, generating the identifier when the software application is installed, launched and updated, checking the identifier and notifying the user are each performed by a cross-platform runtime environment in which the software application runs.

16. The computer-readable medium of claim 15, wherein the identifier identifies a publisher of the software application, and wherein the receiving and the updating are performed periodically and based at least in part on a software installation occurring through the cross-platform runtime environment.

17. The computer-readable medium of claim 13, wherein generating the identifier for the software application comprises generating an identifier corresponding to a software component of the software application when the software application is updated on the computer by addition of the software component.

18. The computer-readable medium of claim 13, wherein checking the identifier comprises checking the identifier for the software application against the status information in the local cache retained by the computer and against new status information obtained from the network-based information server system.

19. A system comprising:
a network-based information server system; and
a computer operable to interact with a user interface device and operable to perform operations comprising:
receiving from the network-based information server system status information corresponding to software applications, the status information comprising black-list information and phoenix-list information;
updating a local cache, retained by the computer, with the status information received from the network-based information server system;
generating an identifier for a software application, using a digital certificate and a hash value, when the software application is launched on the computer;
checking the identifier for the software application against the status information; and
notifying a user of the computer when a match is found during the checking.

20. The system of claim 19, wherein the notifying comprises presenting a warning user interface in which an option to continue launching the software application is contained within the warning user interface when the identifier indicates that the software application falls within either the black-list information or the phoenix-list information, wherein the warning user interface identifies the software application as malicious when the software application falls within the black-list information, and the warning user interface identifies the software application as having a security flaw and indicates a source for an updated version when the software application falls within the phoenix-list information.

21. The system of claim 19, the operations further comprising, when the identifier matches the black-list information:
preventing the software application from running on the computer; and
uninstalling the software application from the computer.

22. The system of claim 19, wherein receiving the status information comprises receiving the status information further comprising white-list information, the operations further comprising generating the identifier for the software application, using the digital certificate and the hash value, when the software application is installed on the computer and when the software application is updated on the computer.

23. The system of claim 22, where the notifying comprises presenting an indication of approval within an installation user interface when the identifier indicates that the software application falls within the white-list information, wherein the indication of approval corresponds to a white-list record for the software application.

24. The system of claim 22, wherein receiving the status information, updating the local cache, generating the identifier when the software application is installed, launched and updated, checking the identifier and notifying the user are each performed by a cross-platform runtime environment in which the software application runs.

25. The system of claim 24, wherein the identifier identifies a publisher of the software application, and wherein the receiving and the updating are performed periodically and based at least in part on a software installation occurring through the cross-platform runtime environment, and wherein the network-based information server system is operable to prioritize the status information to be sent to the computer.

26. The system of claim 22, wherein generating the identifier for the software application comprises generating an identifier corresponding to a software component of the software application when the software application is updated on the computer by addition of the software component.

27. The system of claim 22, wherein checking the identifier comprises checking the identifier for the software application against the status information in the local cache retained by the computer and against new status information obtained from the network-based information server system.

28. The system of claim 19, wherein updating the local cache comprises updating the local cache in a file system location requiring elevated privilege, and the updating is performed at times when the system elevates privilege for other reasons.

29. A computer-implemented method comprising:
receiving, at a network-based information server system, a request from a computer; and
sending, in response to the request, status information corresponding to software applications, the status information comprising black-list information and phoenix-list information;
wherein the status information is used at the computer to update a local cache, retained by the computer, and to check against an identifier for a software application to notify a user of the computer when a match is found, the identifier generated using a digital certificate and a hash value when the software application is launched on the computer.

30. The computer-implemented method of claim 29, wherein sending the status information comprises sending the status information further comprising white-list information, the identifier is further generated for the software application, using the digital certificate and the hash value, when the software application is installed on the computer and when the software application is updated on the computer.

31. The computer-implemented method of claim 30, wherein the local cache update, the identifier generation, the check and the user notification are each performed by a cross-platform runtime environment in which the software application runs.

32. The computer-implemented method of claim 31, further comprising prioritizing the status information to be sent to the computer, wherein the request relates to a software installation occurring through the cross-platform runtime environment.

33. A computer-readable medium encoding a computer program product, operable to cause data processing apparatus to perform operations comprising:
receiving, at a network-based information server system, a request from a computer; and
sending, in response to the request, status information corresponding to software applications, the status information comprising black-list information and phoenix-list information;
wherein the status information is used at the computer to update a local cache, retained by the computer, and to check against an identifier for a software application to notify a user of the computer when a match is found, the identifier generated using a digital certificate and a hash value when the software application is launched on the computer.

34. The computer-readable medium of claim 33, wherein sending the status information comprises sending the status information further comprising white-list information, the identifier is further generated for the software application, using the digital certificate and the hash value, when the software application is installed on the computer and when the software application is updated on the computer.

35. The computer-readable medium of claim 34, wherein the local cache update, the identifier generation, the check and the user notification are each performed by a cross-platform runtime environment in which the software application runs.

36. The computer-readable medium of claim 35, the operations further comprising prioritizing the status information to be sent to the computer, wherein the request relates to a software installation occurring through the cross-platform runtime environment.

* * * * *